(12) United States Patent
Lewis, Jr. et al.

(10) Patent No.: US 9,494,730 B1
(45) Date of Patent: *Nov. 15, 2016

(54) MULTIPLE WAVEGUIDE EDGE LIT STRUCTURE

(71) Applicant: Cooper Technologies Company, Houston, TX (US)

(72) Inventors: Paul Wayne Lewis, Jr., Grantville, GA (US); Chun Wah Chan, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 68 days.

This patent is subject to a terminal disclaimer.

(21) Appl. No.: 14/507,491

(22) Filed: Oct. 6, 2014

Related U.S. Application Data

(63) Continuation of application No. 13/833,081, filed on Mar. 15, 2013, now Pat. No. 8,853,942.

(51) Int. Cl.
   *F21V 8/00* (2006.01)

(52) U.S. Cl.
   CPC ........... *G02B 6/0075* (2013.01); *G02B 6/0068* (2013.01); *G02B 6/0073* (2013.01); *G02B 6/0085* (2013.01); *G02B 6/0088* (2013.01); *G02B 6/0091* (2013.01)

(58) Field of Classification Search
   CPC G02B 6/0075; G02B 6/0068; G02B 6/0073; G02B 6/0085; G02B 6/0088; G02B 6/0091
   See application file for complete search history.

(56) References Cited

U.S. PATENT DOCUMENTS

| | | |
|---|---|---|
| 7,165,856 B2 | 1/2007 | Tseng et al. |
| 2007/0047228 A1 | 3/2007 | Thompson et al. |
| 2009/0290093 A1 | 11/2009 | Shimura et al. |
| 2010/0321953 A1 | 12/2010 | Coleman et al. |
| 2013/0329459 A1 | 12/2013 | Fisher et al. |

*Primary Examiner* — Mary Ellen Bowman
(74) *Attorney, Agent, or Firm* — King & Spalding LLP

(57) ABSTRACT

A multiple waveguide edge lit structure includes a frame structure. The multiple waveguide edge lit structure also includes a circuit board including a first plurality of light emitting diodes (LEDs) and a second plurality of LEDs. The multiple waveguide edge lit structure further includes a first waveguide and a second waveguide. A light receiving edge of the first waveguide is positioned proximal to the first plurality of LEDs, and a light receiving edge of the second waveguide is positioned proximal to the second plurality of LEDs. The multiple waveguide edge lit structure also includes a pair of attachment structures configured to keep the first waveguide and the second waveguide attached to the frame structure.

20 Claims, 8 Drawing Sheets

MULTIPLE WAVEGUIDE EDGE LIT STRUCTURE

CROSS-REFERENCE TO RELATED APPLICATIONS

The present application is a continuation of and claims priority under 35 U.S.C. Section 120 to U.S. Nonprovisional patent application Ser. No. 13/833,081, filed Mar. 15, 2013, and titled "Multiple Waveguide Edge Lit Structure," the entire content of which is incorporated herein by reference.

TECHNICAL FIELD

The present disclosure relates generally to an edge lit light fixture and in particular to an edge lit structure for an edge lit light fixture that includes multiple waveguides.

BACKGROUND

Edge lit light fixtures typically include one or more waveguides (also known as light emitting panels). Typically, an edge lit light fixture that includes multiple waveguides uses multiple individual edge lit structures that each include a single waveguide and respective one or more light sources. Each individual edge lit structure of a multiple waveguide light fixture may include a circuit board with one or more light sources, a waveguide that has an edge placed close to the one or more light sources, and a frame that holds the circuit board and the waveguide.

Typically, each individual edge lit structure of a multiple waveguide light fixture needs to be assembled individually. For example, a circuit board may need to be coupled to a frame of each individual edge lit structure. Each individual edge lit structure of a multiple waveguide light fixture also needs to be installed individually into the multiple waveguide light fixture. For example, each individual structure may need to be individually attached to a frame of the lighting fixture or to a housing. Electrical wires may also need to be extended to the individual structures. Assembly and installation of each individual edge lit structure may be relatively time consuming, labor intensive, and costly.

Accordingly, a single edge lit structure that includes multiple waveguides may reduce cost of a multiple waveguide light fixture and may save time and cost of installation of the multiple waveguide light fixture.

BRIEF DESCRIPTION OF THE DRAWINGS

Reference will now be made to the accompanying figures, which are not necessarily to scale, and wherein.

Figure 1:
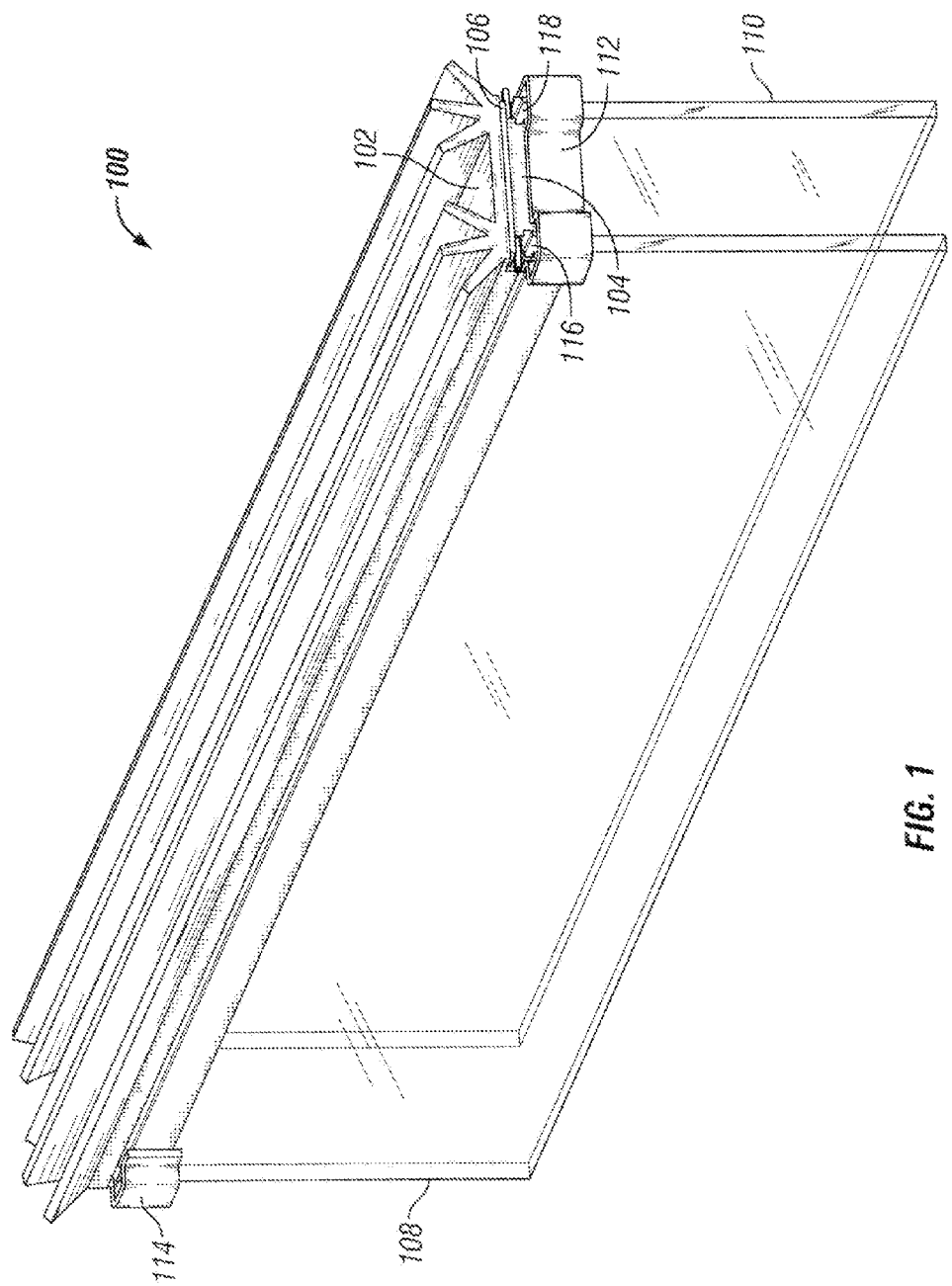
FIG. 1 illustrates a multiple waveguide edge lit structure according to an example embodiment.

The drawings illustrate example embodiments and are therefore not to be considered limiting, as the disclosure may admit to other equally effective embodiments. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

SUMMARY

The present disclosure relates to a multiple waveguide edge lit structure for use with an edge lit light fixture. In an example embodiment, a multiple waveguide edge lit structure includes a frame structure including a first heat sink and a second heat sink. The multiple waveguide edge lit structure also includes a circuit board including a first plurality of light emitting diodes (LEDs) and a second plurality of LEDs, where a portion of the circuit board is sandwiched between the first heat sink and the second heat sink. The multiple waveguide edge lit structure further includes a first waveguide and a second waveguide. A light receiving edge of the first waveguide is positioned proximal to the first plurality of LEDs, and a light receiving edge of the second waveguide is positioned proximal to the second plurality of LEDs. The multiple waveguide edge lit structure also includes a pair of attachment structures configured to keep the first waveguide and the second waveguide attached to the frame structure. Each attachment structure of the pair of attachment structures is attached to the first waveguide and to the second waveguide at a respective end of the frame structure.

In another example embodiment, a multiple waveguide edge lit structure includes a frame structure including a first heat sink and a second heat sink. The multiple waveguide edge lit structure also includes a circuit board including a first plurality of light emitting diodes (LEDs) and a second plurality of LEDs. The first plurality of LEDs and the second plurality of LEDs are positioned on a surface of the circuit board. A portion of the circuit board is sandwiched between the first heat sink and the second heat sink. The multiple waveguide edge lit structure further includes a first waveguide, where a light receiving edge of the first waveguide is positioned proximal to the first plurality of LEDs. The multiple waveguide edge lit structure also includes a second waveguide, where a light receiving edge of the second waveguide is positioned proximal to the second plurality of LEDs. The multiple waveguide edge lit structure 500 further includes a pair of clamps configured to keep the first waveguide and the second waveguide attached to the frame structure. A first clamp of the pair of clamps is attached to the frame structure at a first end of the frame structure, and a second clamp of the pair of clamps is attached to the frame structure at a second end of the frame structure opposite the first end.

In another example embodiment, a multiple waveguide edge lit structure includes a frame structure including a first heat sink and a second heat sink. The multiple waveguide edge lit structure also includes a circuit board including a first plurality of light emitting diodes (LEDs) and a second plurality of LEDs. The first plurality of LEDs is positioned on a first surface of the circuit board, and the second plurality of LEDs is positioned on a second surface of the circuit board opposite the first surface. A portion of the circuit board is sandwiched between the first heat sink and the second heat sink. The multiple waveguide edge lit structure further includes a first waveguide, where a light receiving edge of the first waveguide is positioned proximal to the first plurality of LEDs. The multiple waveguide edge lit structure also includes a second waveguide, where a light receiving edge of the second waveguide is positioned proximal to the second plurality of LEDs. The multiple waveguide edge lit structure further includes a pair of end plates configured to keep the first waveguide and the second waveguide attached to the frame structure. A first end plate of the pair of end plates is attached to the frame structure at a first end of the frame structure, and a second end plate of the pair of end plates is attached to the frame structure at a second end of the frame structure opposite the first end.

These and other aspects, objects, features, and embodiments will be apparent from the following description and the appended claims.

DETAILED DESCRIPTION OF THE EXAMPLE EMBODIMENTS

In the following paragraphs, this disclosure will be described in further detail by way of example with reference to the attached drawings. In the description, well known components, methods, and/or processing techniques are omitted or briefly described so as not to obscure the disclosure. Furthermore, reference to various feature(s) of the particular embodiments is not to suggest that all embodiments must include the referenced feature(s).

Turning now to the drawings, particular embodiments are described. FIG. 1 illustrates a multiple waveguide edge lit structure 100 according to an example embodiment. The multiple waveguide edge lit structure 100 includes a frame structure that includes a first heat sink 102 and a second heat sink 104. The multiple waveguide edge lit structure 100 also includes a light emitting diode (LED) circuit board 106. The LED circuit board 106 includes a first plurality of LEDs 116 and a second plurality of LEDs 118 as light sources. The first plurality of LEDs 116 and the second plurality of LEDs 118 are positioned on the same surface (that is, the same side) of the LED circuit board 106 as described below with respect to FIG. 3.

In an example embodiment, a portion of the LED circuit board 106 is sandwiched between the first heat sink 102 and the second heat sink 104. For example, the first heat sink 102 and the second heat sink 104 may be attached by a fastener that extends through the portion of the LED circuit board 106 that is sandwiched between the first heat sink 102 and the second heat sink 104. Although the first heat sink 102 and the second heat sink 104 are shown to have substantially equal length between the first clamp 112 and the second clamp 114, in alternative embodiments, one of the first heat sink 102 and the second heat sink 104 may be longer than the other.

In an example embodiment, the portion of the LED circuit board 106 that is sandwiched between the first heat sink 102 and the second heat sink 104 is between the first plurality of the LEDs 116 and the second plurality of LEDs 118. To illustrate, the first plurality of LEDs 116 may be positioned proximal to a first edge of the LED circuit board 106, and the second plurality of LEDs 118 may be positioned proximal to another edge of the LED circuit board 106 opposite the first edge.

In an example embodiment, the multiple waveguide edge lit structure 100 includes a first waveguide 108 and a second waveguide 110 that are attached to the frame structure. For example, the first waveguide 108 and the second waveguide 110 may be made from acrylic. A light receiving edge of the first waveguide 108 is positioned proximal to the first plurality of LEDs 116. A light receiving edge of the second waveguide 110 is positioned proximal to the second plurality of LEDs 118. In an example embodiment, the first waveguide 108 is configured to receive light from the first plurality of LEDs 116 through its light receiving edge and to emit the light through one or both broad sides of the first waveguide 108. Similarly, the second waveguide 110 is configured to receive light from the second plurality of LEDs 118 through its light receiving edge and to emit the light through one or both broad sides of the second waveguide 110. In an example embodiment, the first plurality of LEDs 116 is positioned on the surface of the LED circuit board 106 along substantially the length of the first waveguide 108. Similarly, the second plurality of LEDs 118 is positioned on the surface of the LED circuit board 106 along substantially the entire length of the second waveguide 110.

In an example embodiment, the multiple waveguide edge lit structure 100 includes a pair of attachment structures such as a first clamp 112 and a second clamp 114. The first clamp 112 is attached to the frame structure at a first end of the frame structure. To illustrate, the first clamp 112 may be attached to the second heat sink 104 of the frame structure, for example, by a fastener as described below with respect to FIG. 4. Similarly, in an example embodiment, the second clamp 114 is attached to the frame structure at a second end of the frame structure. For example, the second clamp 114 may be attached to the second heat sink 112 by a fastener such as one or more screws.

In an example embodiment, the first clamp 112 and the second clamp 114 keep the first waveguide 108 and the second waveguide 110 attached to the frame structure. To illustrate, each of the first clamp 112 and the second clamp 114 is attached to both the first waveguide 108 and to the second waveguide 110. For example, at a first end of the frame structure, the first clamp 112 may press against the first waveguide 108 and the second waveguide 110 towards the second heat sink 104. Similarly, at a second end of the frame structure opposite the first end, the second clamp 114 may press against each of the first waveguide 108 and the second waveguide 110 towards the second heat sink 104.

By including the LED circuit board 106 between the first heat sink 102 and the second heat sink 104, heat from the LED circuit board 106, the first plurality of LEDs 116, and the second plurality of LEDs 118 may be efficiently dissipated by the first heat sink 102 and the second heat sink 104. Because a relatively large surface area of the LED circuit board 106 is in contact with the first heat sink 102 and the second heat sink 104, heat from the LED circuit board 106 may be efficiently transferred to the first heat sink 102 and the second heat sink 104. Further, a light fixture may be assembled by installing fewer units of the multiple waveguide edge lit structure 100 than the number units of a single waveguide edge lit structure, which may reduce cost of the light fixture as well as installation time.

Although the multiple waveguide edge lit structure 100 is described as having the LED circuit board 106, in alternative embodiments, the multiple waveguide edge lit structure 100 may instead have a circuit board that has light sources other than LEDs attached to it. Although the multiple waveguide edge lit structure 500 is described as having two waveguides 108, 110, in alternative embodiments, the multiple waveguide edge lit structure 100 may have more than two waveguides, where additional waveguides are attached parallel to the waveguides 108, 110.

Figure 2:
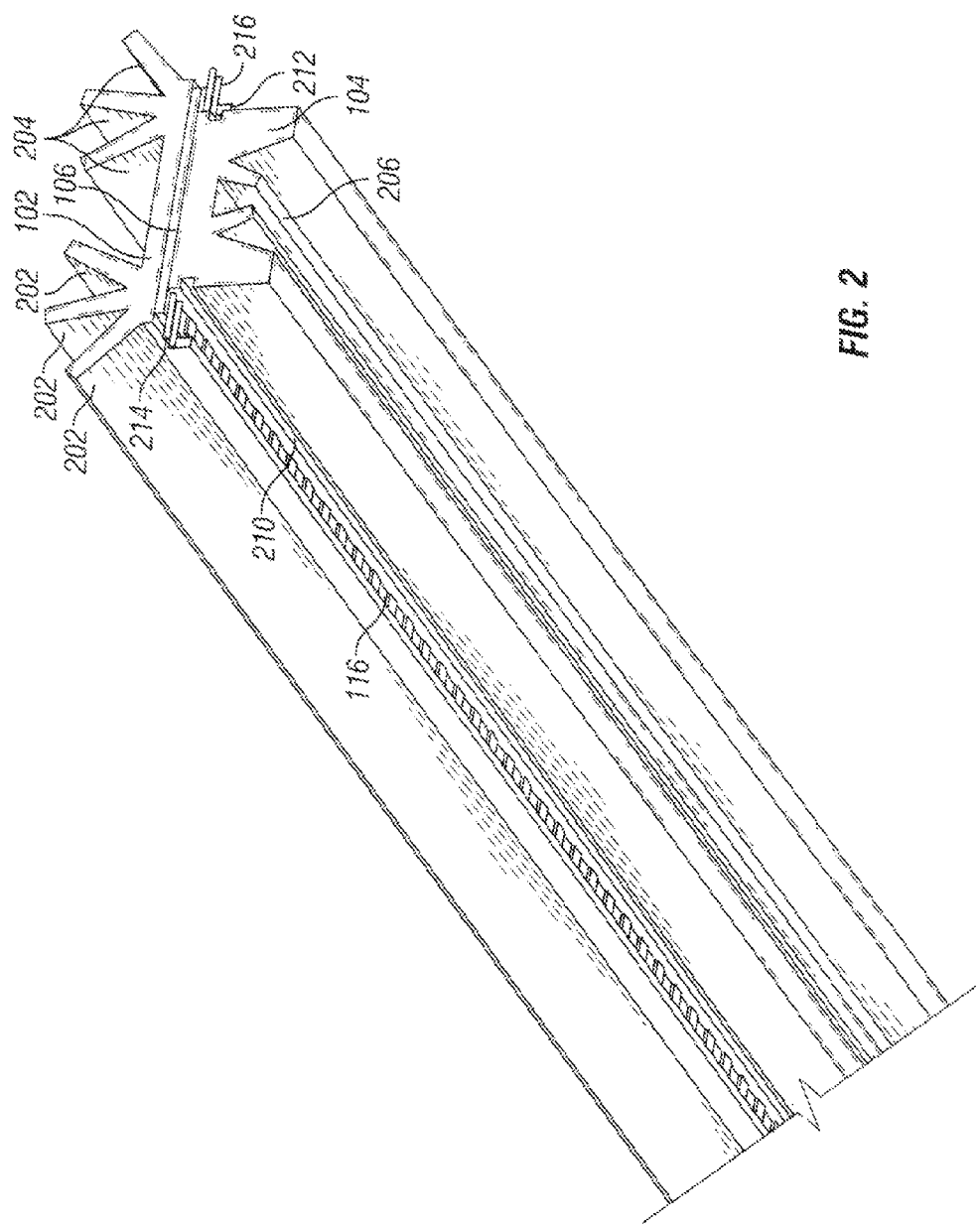
FIG. 2 illustrates the multiple waveguide edge lit structure of FIG. 1 without waveguides attached to a frame structure of the multiple waveguide edge lit structure according to an example embodiment.

FIG. 2 illustrates the multiple waveguide edge lit structure of FIG. 1 without waveguides attached to a frame structure of the multiple waveguide edge lit structure according to an example embodiment. Although FIG. 2 shows one end of the multiple waveguide edge lit structure 100 without waveguides, the description below with respect to FIG. 2 similarly applies to the opposite end of the multiple waveguide edge lit structure 100 illustrated in FIG. 1. The frame structure includes the first heat sink 102 and the second heat sink 104. As described above with respect to FIG. 1, a portion of the LED circuit board 106 is sandwiched between the first heat sink 102 and the second heat sink 104. The first heat sink 102 and the second heat sink 104 may be made from the same or different heat conducting materials. For example, both the first heat sink 102 and the second heat sink 104 may be made from aluminum.

In an example embodiment, the first heat sink 102 includes a first set of protrusions 202 and a second set of protrusions 204. The first set of protrusions 202 are positioned proximal to the first plurality of LEDs 116 disposed on the LED circuit board 106 substantially for the entire lengths of the first heat sink 102. In an example embodiment, the first set of protrusions 202 also extends longitudinally for substantially the entire length of the first heat sink 102.

Figure 3:
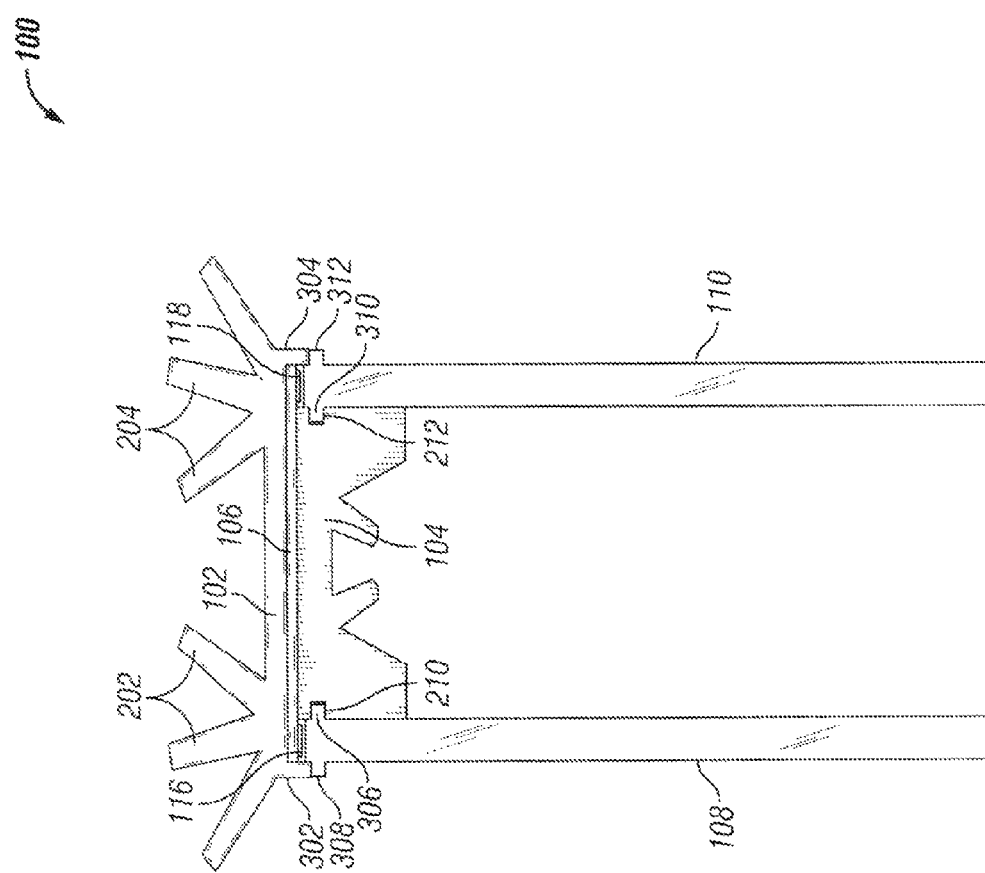
FIG. 3 illustrates a cross sectional view of the multiple waveguide edge lit structure of FIG. 1 according to an example embodiment.

In an example embodiment, the second set of protrusions 204 is positioned proximal to the second plurality of LEDs 118 illustrated in FIGS. 1 and 3. Similar to the first plurality of LED 116 shown in FIG. 2, the second plurality of LEDs 118 is also disposed on the LED circuit board 106 for substantially the entire length of the first heat sink 102. The first set of protrusions 202 and the second set of protrusions 204 can dissipate heat from the LED circuit board 106 and from the plurality of LEDs 116, 118. As illustrated in FIG. 2, each of the first set of protrusions 202 and the second set of protrusions 204 extends in a direction away from the LED circuit board 106 and from the corresponding plurality of LEDs 116 or 118.

In an example embodiment, the second heat sink 104 includes one or more protrusions 206 that can dissipate heat from one or more of the LED circuit board 106, the first plurality of LEDs 116, and the second plurality of LEDs 118. For example, because the first plurality of LEDs 116 are positioned on a surface of the LED circuit board 106 facing the second heat sink 104, the LED circuit board may include routing metal, such as copper, on or close to the particular surface. The routing metal on the portion of the LED circuit board 106 enables efficient transfer of heat from the LED circuit board 106 to the second heat sink 104.

In an example embodiment, the second heat sink 104 includes a first channel 210 and a second channel 212. The first channel 210 extends longitudinally on a first side of the second heat sink 104. For example, the first channel 210 may longitudinally extend along the first side of the second heat sink 104 substantially for the entire length of the second heat sink 104. Alternatively, the first channel 210 may longitudinally extend along the first side of the second heat sink 104 for substantially less than the entire length of the second heat sink 104. The first channel 210 is configured to receive a protruding portion of the first waveguide 108 of FIG. 1 as described below with respect to FIG. 3.

Similarly, the second channel 212 extends longitudinally on a second side of the second heat sink 104 opposite the first side. For example, the second channel 212 may longitudinally extend along the second side of the second heat sink 104 substantially for the entire length of the second heat sink 104. Alternatively, the second channel 212 may longitudinally extend along the second side of the second heat sink 104 for substantially less than the entire length of the second heat sink 104. The second channel 212 is configured to receive a protruding portion of the second waveguide 110 of FIG. 1 as also described below with respect to FIG. 3.

In an example embodiment, a first pair of wires 214 and a second pair of wires 216 are coupled to the LED circuit board 106. The first pair of wires 214 may provide electrical power to the first plurality of LEDs 116. The second pair of wires 216 may provide electrical power to the second plurality of LEDs 118 illustrated in FIGS. 1 and 3.

Because a relatively large surface area of the LED circuit board 106 is sandwiched between the first heat sink 102 and the second heat sink 104, heat from the LED circuit board 106 may be efficiently transferred to the first heat sink 102 and the second heat sink 104 that dissipate the heat. The efficient transfer of heat to the first heat sink 102 and the second heat sink 104 has benefits including prolonged life of LED circuit board components and of the pluralities of LEDs.

Although two pairs of wires 214 and 216 are coupled to the LED circuit board 106 in FIG. 2, in alternative embodiments, a single pair of wires may instead be coupled to the LED circuit board to provide power to all LEDs disposed on the LED circuit board 106. Further, in alternative embodiments, a pair of wires (for example the pair of wires 214) may be coupled to the LED circuit board 106 close to a first longitudinal end of the LED circuit board 106, and another pair of wires (for example the pair of wires 216) may be coupled to the LED circuit board 106 close to the opposite longitudinal end of the LED circuit board 106. Furthermore, although the first heat sink 102 and the second heat sink 104 are shown to have substantially equal length between the first clamp 112 and the second clamp 114, in alternative embodiments, one of the first heat sink 102 and the second heat sink 104 may be longer than the other.

FIG. 3 illustrates a cross sectional view of the multiple waveguide edge lit structure 100 of FIG. 1 according to an example embodiment. As illustrated in FIG. 3, a portion of the LED circuit board 106 is sandwiched between the first heat sink 102 and the second heat sink 104 of the frame structure of the multiple waveguide edge lit structure 100. The first plurality of LEDs 116 is disposed on a surface of the LED circuit board 106 proximal to a first edge of the LED circuit board 106. The second plurality of the LEDs 118 is disposed on the same surface of the LED circuit board 106 as the first plurality of LEDs 116. The second plurality of the LEDs 118 is disposed on the surface of the LED circuit board 106 proximal to a second edge of the LED circuit board 106 that is opposite the first edge. As illustrated in FIG. 3, the portion of the LED circuit board 106 that is sandwiched between the first heat sink 102 and the second heat sink 104 is between the first plurality of the LEDs 116 and the second plurality of LEDs 118.

The first heat sink 102 includes the first set of protrusions 202 and the second set of protrusions 204. The first set of protrusions 202 are disposed proximal to the first plurality of LEDs 116, and the second set of protrusions 204 are disposed proximal to the second plurality of LEDs 118. By being placed close to a respective plurality of LEDs 116 or 118, the first set of protrusions 202 and the second set of protrusions 204 can efficiently dissipate heat generated by the respective plurality of LEDs 116 or 118.

In an example embodiment, the first heat sink 102 includes a first side wall 302 and a second side wall 304. The first side wall 304 is on a first side of the first heat sink 102, and the second side wall 304 is on a second side of the first heat sink 102 opposite the first side. The first plurality of LEDs 116 is disposed on the surface of the LED circuit 106 between the first side wall 302 of the first heat sink 102 and a surface of the second heat sink 104. Similarly, the second plurality of LEDs 118 is disposed on the surface of the LED circuit 106 between the second side wall 304 of the first heat sink 102 and a surface of the second heat sink 104.

In an example embodiment, the second heat sink 104 includes the first channel 210 that extends longitudinally along a first side of the second heat sink 104 as described above with respect to FIG. 2. The second heat sink 104 also includes the second channel 212 that also extends longitudinally along a second side of the second heat sink 104 opposite the first side.

In an example embodiment, the first waveguide 108 is configured to receive light from the first plurality of LEDs 116 and to emit the light through one or both broad sides of the first waveguide 108. A light receiving edge of the first waveguide 108 that is configured to receive light from the first plurality of LEDs 116 is positioned proximal to the first plurality of LEDs 116 between the first side wall 302 of the first heat sink 104 and a surface of the second heat sink 104.

In an example embodiment, the first waveguide 108 includes a first protrusion 306 and a second protrusion 308. When the first waveguide 108 is attached to the frame structure, the second protrusion 308 is positioned below the first side wall 302 of the first heat sink 104 viewed in the orientation of the multiple waveguide edge lit structure 100 shown in FIG. 3. The first waveguide 108 is attached to the second heat sink 104 by positioning the first protrusion 306 of the first waveguide 108 in the first channel 210 of the second heat sink 104. For example, the first waveguide 108 may be attached to the second heat sink 104 by sliding the first protrusion 306 into the first channel 210 at one end of the second heat sink 104. Positioning the first protrusion 306 of the first waveguide 108 in the first channel 210 and positioning the second protrusion 308 below the first side wall 302 maintain the light receiving edge of the first waveguide 108 at a particular distance from the second plurality of LEDs 118, for example, for efficient transfer of light from the first plurality of LEDs 116 to the first waveguide 108.

In an example embodiment, the second waveguide 110 is configured to receive light from the second plurality of LEDs 118 and to emit the light through one or both broad sides of the second waveguide 110. A light receiving edge of the second waveguide 110 that is configured to receive light from the second plurality of LEDs 118 is positioned proximal to the second plurality of LEDs 118 between the second side wall 304 of the first heat sink 102 and a surface of the second heat sink 104.

In an example embodiment, the second waveguide 110 includes a first protrusion 310 and a second protrusion 312. When the second waveguide 110 is attached to the frame structure, the second protrusion 312 is positioned below the second side wall 304 of the first heat sink 104 viewed in the orientation of the multiple waveguide edge lit structure 100 shown in FIG. 3. The second waveguide 110 is attached to the second heat sink 104 by positioning the first protrusion 310 of the second waveguide 110 in the second channel 212 of the second heat sink 104. For example, the second waveguide 110 may be attached to the second heat sink 104 by sliding the first protrusion 310 into the second channel 212 at one end of the second heat sink 104. Positioning the first protrusion 310 of the second waveguide 110 in the second channel 212 and positioning the second protrusion 312 below the second side wall 304 maintain the light receiving edge of the second waveguide 110 at a particular distance from the second plurality of LEDs 118, for example, for efficient transfer of light from the second plurality of LEDs 118 to the second waveguide 110.

Although the first waveguide 108 and the second waveguide 110 each have a protrusion on each side, in alternative embodiments, the first waveguide 108 and the second waveguide 110 may have more than one protrusion or no protrusion on one or both side. Further, although the multiple waveguide edge lit structure 100 is described as having the plurality of LEDs 116, 118, in alternative embodiments, the multiple waveguide edge lit structure 100 may have light sources other than LEDs.

Figure 4:
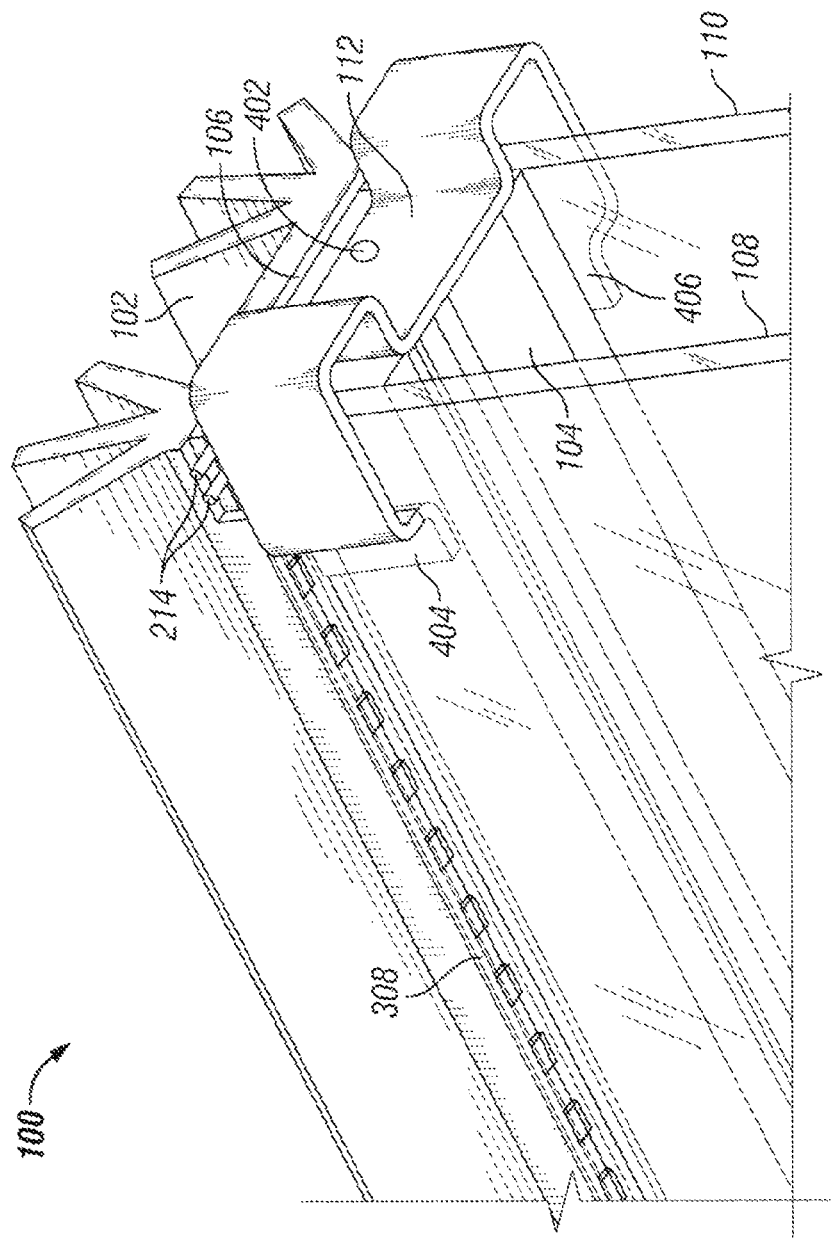
FIG. 4 illustrates a close up view of a portion of the multiple waveguide edge lit structure of FIG. 1 according to an example embodiment.

FIG. 4 illustrates a close up view of a portion of the multiple waveguide edge lit structure of FIG. 1 according to an example embodiment. Although FIG. 4 shows one end of the multiple waveguide edge lit structure 100, the description below with respect to FIG. 4 similarly applies to the opposite end of the multiple waveguide edge lit structure 100 illustrated in FIG. 1. As shown in FIG. 4, the multiple waveguide edge lit structure 100 includes the LED circuit board 106 that has a portion sandwiched between the first heat sink 102 and the second heat sink 104. The pair of wires 214 may be coupled to the LED circuit board 106. For example, the pair of wires 214 may provide power from power supply to the first plurality of LEDs 116 and the second plurality of LEDs 118 described above with respect to FIGS. 1-3.

In an example embodiment, the multiple waveguide edge lit structure 100 includes the first clamp 112 that is attached to the frame structure that includes the first heat sink 102 and the second heat sink 104. In particular, the first clamp 112 is attached to the second heat sink 104 by a fastener 402 that extends through the first clamp 112.

As described above with respect to FIG. 1, the first clamp 112 is configured to keep the first waveguide 108 and the second waveguide 110 attached to the frame structure. To illustrate, a first tab 404 of the first clamp 112 rests on the first waveguide 108 and presses against the first waveguide 108 towards the second heat sink 104. For example, the first tab 404 may maintain the first protrusion 306 of the first waveguide 108 in the first channel 210 illustrated in FIG. 3 and prevent the first waveguide 108 from sliding in the first channel 210. Similarly, a second tab 406 of the first clamp 112 rests on the second waveguide 110 and presses against the second waveguide 110 towards the second heat sink 104. For example, the second tab 406 may maintain the first protrusion 310 of the second waveguide 110 in the second channel 212 illustrated in FIG. 3 and prevent the second waveguide 110 from sliding in the second channel 212.

In an example embodiment, the first clamp 112 may keep first the first waveguide 108 and the second waveguide 110 attached to the second heat sink 104 through friction without use of a fastener extending through the respective first tab 404 and second tab 406. The first clamp 112 may be attached to the first waveguide 108 and to the second waveguide 110 by stretching the first tab 404 and the second tab 406 outwardly and releasing the first tab 404 and the second tab 406 onto the respective the waveguide 108 or 110 once the clamping device 112 is positioned as desired. Once the clamp 112 is fastened to the second hat sink 104, the side of the clamp 112 that is attached to the second heat sink 104 may prevent the first waveguide 108 and the second waveguide 110 from sliding out. The clamp 112 may be made from different materials such as steel and aluminum.

Although the clamp 112 is shown in FIG. 4 as having a particular shape, the clamp 112 may have other shapes without departing from the scope of this description. Further, the first clamp 112 is described above with respect to FIG. 4, the description above similarly applies to the second clamp 114 described with respect to FIG. 1.

Figure 5:
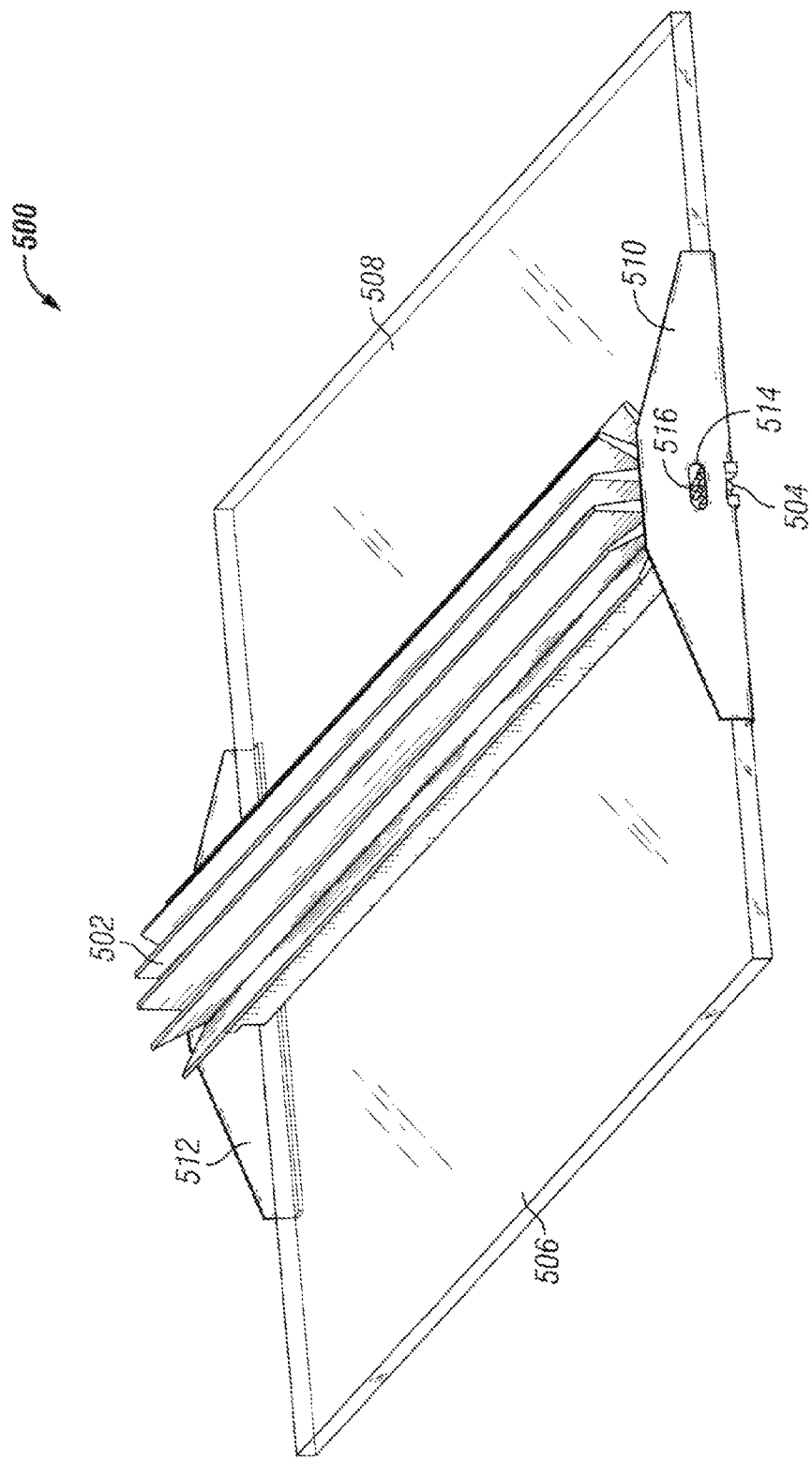
FIG. 5 illustrates a multiple waveguide edge lit structure according to another example embodiment.

FIG. 5 illustrates a multiple waveguide edge lit structure according to another example embodiment. The multiple waveguide edge lit structure 500 includes a frame structure 502 and an LED circuit board 504. As described below with respect to FIGS. 6 and 7, the LED circuit board 504 is partially positioned within the frame structure 502. For example, the frame structure 502 may be made from a metal such as aluminum and may dissipate heat from the LED circuit board 504. In an example embodiment, the frame structure 502 may include two integrally made or distinct heat sinks as described below with respect to FIGS. 6-8.

The multiple waveguide edge lit structure 500 further includes a first waveguide 506 and a second waveguide 508 that are attached to the frame structure 502. For example, the first waveguide 506 and the second waveguide 508 may be made from acrylic. As further described below with respect to FIGS. 6 and 7, a first plurality of LEDs are positioned on a first surface of the LED circuit board 504 facing the first wave guide 506, and a second plurality of LEDs are positioned on another surface of the LED circuit board 504 facing the second wave guide 508 and opposite the first surface.

The multiple waveguide edge lit structure 500 further includes a first end plate 510 and a second end plate 512. The first end plate 510 is attached to a first end of the frame structure 502, and the second end plate 512 is attached to a second end of the frame structure 502 opposite the first end. The first end plate 510 and the second end plate 512 may be made from a metal, such as steel and aluminum, or from plastic. In an example embodiment, the first end plate 510 includes an aperture 514. In some embodiments, the second end plate 512 may also have a corresponding aperture. A pair of wires 516 may pass through the aperture 514 of the first end plate 510 and may be coupled to the LED circuit board 504. For example, the pair of wires 516 may provide power to LEDs attached to the LED circuit board 504 described below with respect to FIG. 6.

In an example embodiment, the first end plate 510 and the second end plate 512 keep the first waveguide 506 and the second waveguide 508 attached to the frame structure 502. For example, the first waveguide 506 and second waveguide 508 may rest on flanges of the first end plate 510 and the second end plate 512 as described below with respect to FIGS. 6 and 8. The flanges of the first end plate 510 and the second end plate 512 can prevent the first waveguide 506 and the second waveguide 508 from detaching from the frame structure 502. To illustrate, the flanges of the first end plate 510 and the second end plate 512 can press against the first waveguide 506 and the second waveguide 508 towards the frame structure 502. The first end plate 510 and the second end plate 512 may also be fastened to the frame structure 502 such that the first end plate 510 and the second end plate 512 prevent the first waveguide 506 and the second waveguide 508 from horizontally sliding away from the frame structure 502.

By positioning a portion of the LED circuit board 504 within frame structure 502, heat from the LED circuit board 106 and/or from the LEDs attached to the surfaces of the LED circuit board 504 may be efficiently dissipated by the frame structure 502. Because a relatively large surface area of the LED circuit board 504 can be in contact with the frame structure 502, heat from the LED circuit board 106 may be efficiently transferred to the frame structure 502. Further, a light fixture may be assembled by installing fewer units of the multiple waveguide edge lit structure 500 than the number units of a single waveguide edge lit structure, which may reduce cost of the light fixture as well as installation time.

Although the first heat sink 102 and the second heat sink 104 are shown to have substantially equal length between the first clamp 112 and the second clamp 114, in alternative embodiments, one of the first heat sink 102 and the second heat sink 104 may be longer than the other. Although the multiple waveguide edge lit structure 500 is described as having the LED circuit board 504, in alternative embodiments, the multiple waveguide edge lit structure 500 may instead have a circuit board that has light sources other than LEDs attached to it.

Figure 6:
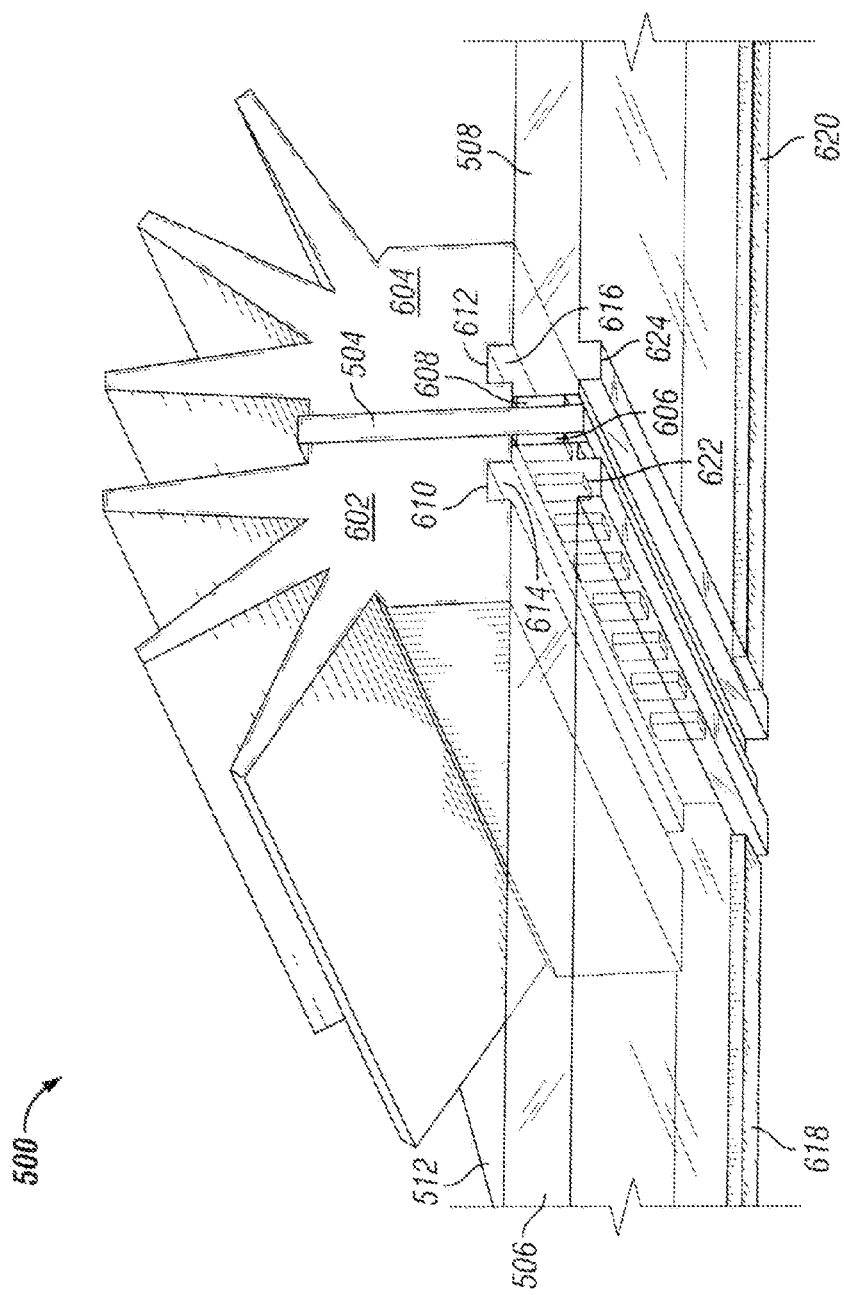
FIG. 6 illustrates the multiple waveguide edge lit structure of FIG. 5 with one of two end plates removed for illustration according to an example embodiment.

FIG. 6 illustrates the multiple waveguide edge lit structure 500 of FIG. 5 with one of two end plates removed for illustration according to an example embodiment. The multiple waveguide edge lit structure 500 includes a first heat sink 602 and a second heat sink 604. In an example embodiment, the frame structure 502 of FIG. 5 includes the first heat sink 602 and the second heat sink 604. For example, both the first heat sink 602 and the second heat sink 604 may be made from aluminum. The multiple waveguide edge lit structure 500 also includes the LED circuit board 504. A portion of the LED circuit board 504 is sandwiched between the first heat sink 602 and the second heat sink 604. The first heat sink 602 and the second heat sink 604 may be attached by one or more fasteners extending through the LED circuit board that is sandwiched between the first heat sink 602 and the second heat sink 604. Alternatively, the first heat sink 602 and the second heat sink 604 may be integrally made with a gap therebetween for positioning the LED circuit board 504.

As illustrated in FIG. 6, a large portion of the LED circuit board 504 may be positioned between the first heat sink 602 and the second heat sink 604, which allows for efficient heat transfer from the LED circuit board 504 to the first heat sink 602 and to the second heat sink 604. For example, a copper metal layer on each side of the LED circuit board 504 may be in contact with the respective heat sink 602 or 604 facilitating efficient heat transfer from the LED circuit board 504 to the first heat sink 602 and to the second heat sink 604.

The multiple waveguide edge lit structure 500 further includes a first plurality of LEDs 606 and a second plurality of LEDs 608. The first plurality of LEDs 606 is disposed on a first surface of the LED circuit board 504, and the second plurality of LEDs 608 is disposed on a second surface of the LED circuit board 504 opposite the first surface.

In an example embodiment, the first heat sink 602 includes a first channel 610 that extends longitudinally on a side of the first heat sink 602. The first channel 610 may extend, for example, for the entire length of the first heat sink 602. Similarly, the second heat sink 604 includes a second channel 612 that extends longitudinally on a side of the second heat sink 604. The second channel 612 may extend, for example, for the entire length of the second heat sink 604.

In an example embodiment, the multiple waveguide edge lit structure 500 includes the first waveguide 506 and the second waveguide 508 disposed on opposite sides of the LED circuit board 504. The first waveguide 506 includes a light receiving side that is configured to receive light from the first plurality of LEDs 606. The first waveguide 506 is attached to the first heat sink 602 such that a light receiving edge of the first waveguide 506 is positioned proximal to the first plurality of LEDs 606. The first waveguide 506 also includes a first protrusion 614 and a second protrusion 622. The first protrusion 614 extends out from a first broad surface of the first waveguide 506. The second protrusion 622 extends out from a second broad side of the first waveguide 506 opposite the first broad side. The first protrusion 614 of the first waveguide 506 is positioned in the first channel 610 of the first heat sink 602. For example, the first protrusion 614 may be horizontally slid into the first channel 610 at one of the two ends of the first heat sink 602 prior to attachment of one or both of the first end plate 510 shown in FIG. 5 and the second end plate 512. Alternatively, the first protrusion 614 may be vertically slid into the first channel 610 after orienting the first heat sink 602 upside down relative to its orientation shown in FIG. 6.

Similarly, the second waveguide 508 includes a light receiving side that is configured to receive light from the second plurality of LEDs 608. The second waveguide 508 is attached to the second heat sink 604 such that a light receiving edge of the second waveguide 508 is positioned proximal to the second plurality of LEDs 608. The second waveguide 508 also includes a first protrusion 616 and a second protrusion 624. The first protrusion 616 extends from a first broad surface of the second waveguide 508. The second protrusion 624 extends from a second broad side of the second waveguide 508 opposite the first broad side. The first protrusion 616 of the second waveguide 508 is positioned in the second channel 612 of the second heat sink 604. For example, the second protrusion 616 may be horizontally slid into the second channel 612 at one of the two ends of the second heat sink 604 prior to attachment of one or both of the first end plate 510 shown in FIG. 5 and the second end plate 512. Alternatively, the first protrusion 614 may be vertically slid into the second channel 612 after orienting the second heat sink 604 upside down relative to its orientation shown in FIG. 6.

In an example embodiment, the second end plate 512 is fastened to one or both of the first heat sink 602 and the second heat sink 604. The second end plate 512 includes a first flange 618 and a second flange 620. The first flange 618 and the second flange 620 extend in a substantially horizontal plane at the bottom of the second end plate 512. For example, the first waveguide 506 and second waveguide 508 may rest on the first flange 618 and the second flange 620 of the second end plate 512. Alternatively or in addition, the first flange 618 and the second flange 620 may press against the first waveguide 506 and the second waveguide 508 towards the first heat sink 602 and towards the second heat sink 604, respectively, to keep the first waveguide 506 and the second waveguide 508 attached to the first heat sink 602 and to the second heat sink 604.

In an example embodiment, the first flange 618 and the second flange 620 are separated by a gap where respective end portions of the second protrusion 622 of the first waveguide 506 and the second protrusion 624 of the second waveguide 508 are positioned. In an example embodiment, the first end plate 510, illustrated in FIGS. 6 and 8, also includes a first flange and a second flange that correspond to the first flange 618 and the second flange 620 of the second end plate 512, where respective end portions of the second protrusion 622 and the second protrusion 624 are positioned in a gap between the first flange and the second flange. The first waveguide 506 and second waveguide 508 may also rest on the flanges of the first end plate 510 at opposite ends of the first waveguide 506 and second waveguide 508 as described with respect to FIG. 8.

Figure 8:
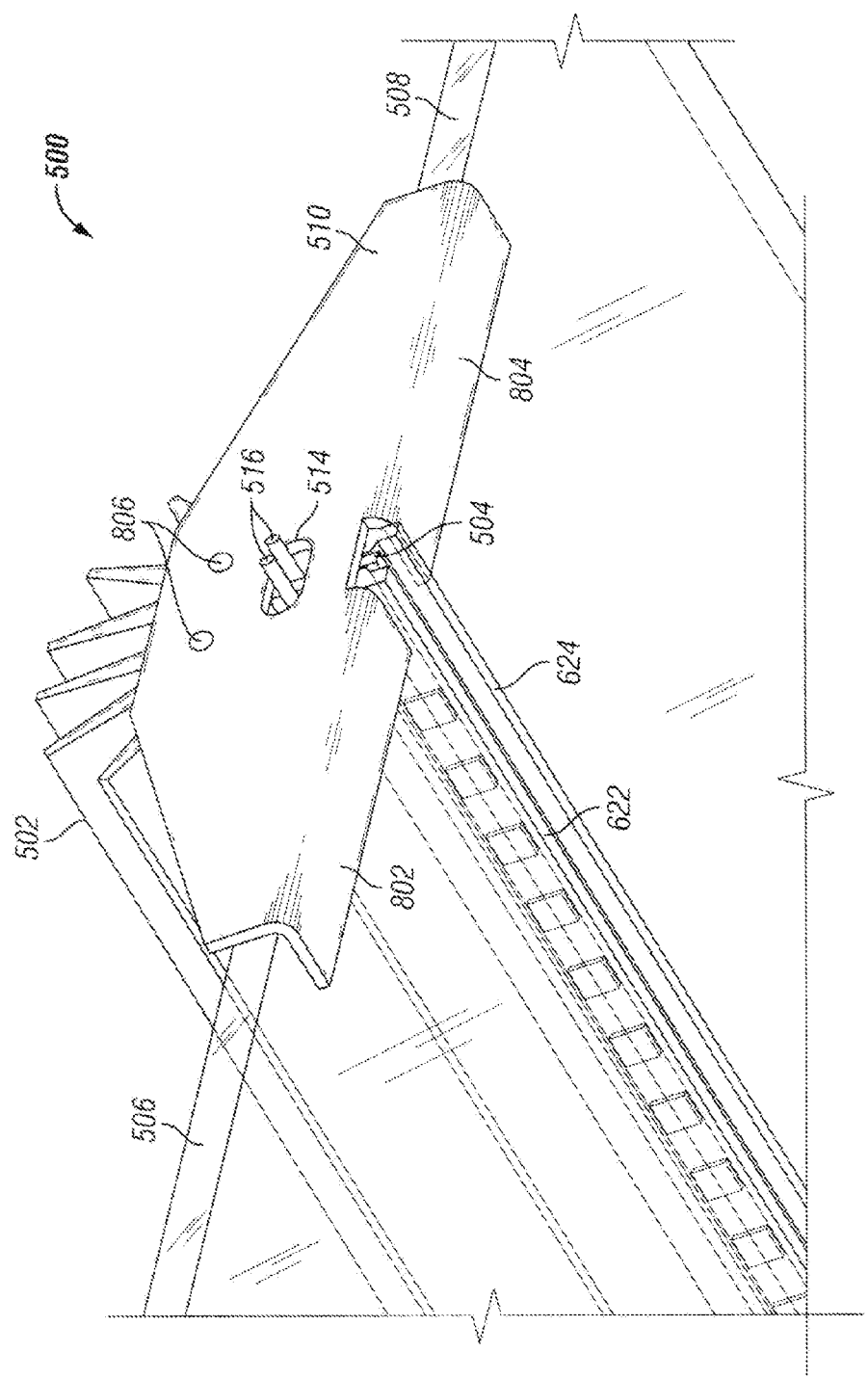
FIG. 8 illustrates a close up view of a portion of the multiple waveguide edge lit structure of FIG. 5 according to an example embodiment.

Positioning the first protrusion 614 of the first waveguide 506 in the first channel 610 and positioning respective end portions of the second protrusion 622 in the gap between the flanges of the first end plate 510 shown in FIG. 8 and in the gap between the flanges 618, 620 of the second end plate 512 maintain the light receiving edge of the first waveguide 506 at a particular distance from the first plurality of LEDs 606. Such positioning of the protrusions 614 and 622 prevents the first waveguide 506 from moving towards and/or away from the first plurality of LEDs 606 and helps in maintaining the first waveguide 506 attached to the first heat sink 602.

Similarly, positioning the first protrusion 616 of the second waveguide 508 in the first channel 612 and positioning respective end portions of the second protrusion 624 in the gap between the flanges of the first end plate 510 shown in FIG. 8 and in the gap between the flanges 618, 620 of the second end plate 512 maintain the light receiving edge of the second waveguide 508 at a particular distance from the second plurality of LEDs 608. Such positioning of the protrusions 616, 624 prevents the second waveguide 508 from moving towards and/or away from the second plurality of LEDs 608 and helps in maintaining the second waveguide 508 attached to the second heat sink 604.

Because a relatively large surface area of the LED circuit board 504 is sandwiched between the first heat sink 602 and the second heat sink 604, heat from the LED circuit board 504 may be efficiently transferred to the first heat sink 602 and the second heat sink 604 that dissipate the heat. The efficient transfer of heat to the first heat sink 602 and the second heat sink 604 has benefits including prolonged life of LED circuit board components and of the pluralities of LEDs 606, 608.

Although FIG. 6 shows that a particular portion of the LED circuit board 504 is positioned between the first heat sink 602 and the second heat sink 604, in alternative embodiments, smaller or larger portions of the LED circuit board 504 may be positioned between the heat sinks 602, 604. Further, although a portion of the LED circuit board 504 is showing sticking above the heat sinks 602, 604, in alternative embodiments, the LED circuit board 504 may not have any portion sticking above the heat sinks 602, 604. For example, when the first heat sink 602 and second heat sink 604 are integrally formed, the top portion of the LED circuit board 504 may be sandwiched by the heat sinks 602, 604.

Although the first waveguide 506 and the second waveguide 508 each have a protrusion on each side, in alternative embodiments, the first waveguide 506 and the second waveguide 508 may have more than one protrusion or no protrusion on one or both side. Further, although the multiple waveguide edge lit structure 500 is described as having the plurality of LEDs 606, 608, in alternative embodiments, the multiple waveguide edge lit structure 500 may have light sources other than LEDs.

Figure 7:
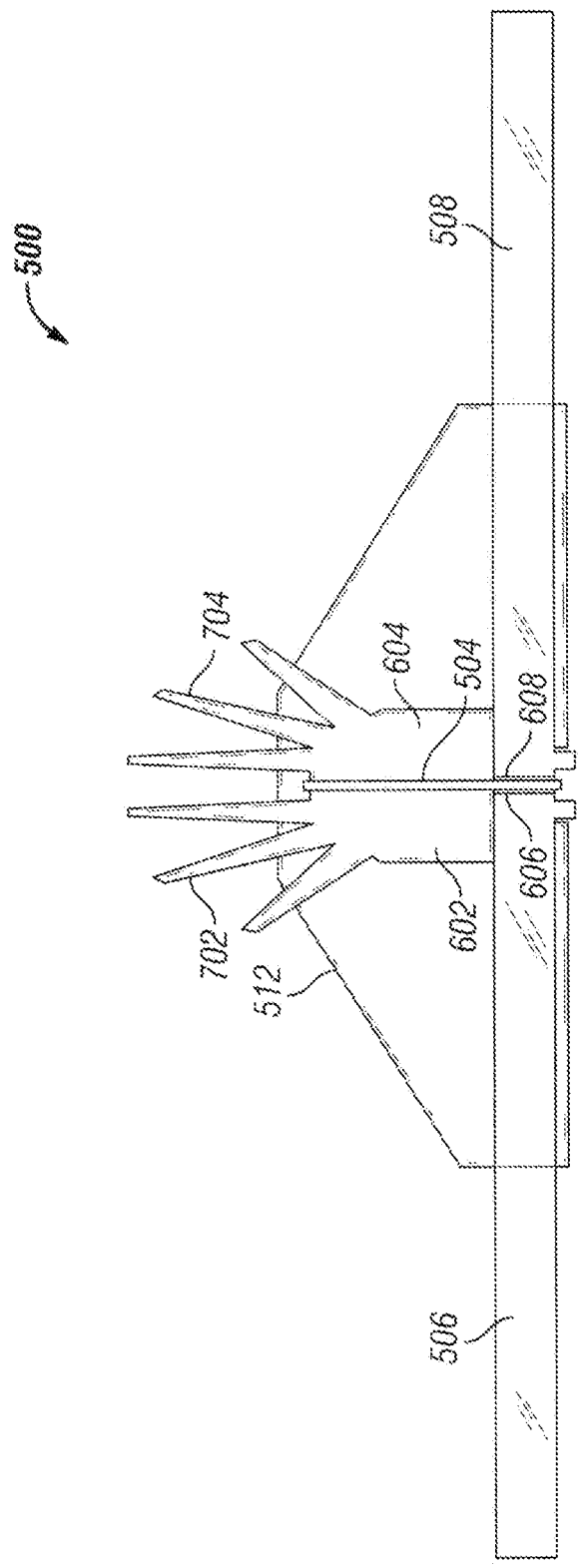
FIG. 7 illustrates a side view of the multiple waveguide edge lit structure of FIG. 5 with one of two end plates removed for illustration according to an example embodiment.

FIG. 7 illustrates a side view of the multiple waveguide edge lit structure 500 of FIG. 5 with the first end plate 510 removed for illustration according to an example embodiment. As illustrated in FIG. 7, a large portion of the LED circuit board 504 is sandwiched between the first heat sink 602 and the second heat sink 604, which enable efficient heat transfer from the LED circuit board 504 to the heat sinks 602, 604. The first heat sink 602 includes one or more protrusions 702 configured to dissipate heat. For example, the one or more protrusions 702 may dissipate the heat transferred from the LED circuit board 504. Similarly, the second heat sink 604 includes one or more protrusions 704 configured to dissipate the heat from the LED circuit board 504. Although three protrusions are shown extending from each of the first heat sink 602 and the second heat sink 604, in alternative embodiments, each of the first heat sink 602 and the second heat sink 604 may have fewer or more than three protrusions. Further, the protrusions 702 and 704 may have shapes other than shown in the FIG. 7.

As illustrated in FIG. 7, a light receiving edge of the first waveguide 506 is positioned close to the first plurality of LEDs 606 disposed on a surface of the LED circuit board 504 facing the first waveguide 506. Similarly, a light receiving edge of the second waveguide 508 is positioned close to the second plurality of LEDs 608 that are disposed on an opposite surface of the LED circuit board 504 facing the second waveguide 508. As illustrated, the first plurality of the LEDs 606 and the second plurality of the LEDs 608 are positioned close to an edge of the LED circuit board 504 and adjacent to the first heat sink 602 and the second heat sink 604, respectively. The second end plate 512 may be attached to one or both of the first heat sink 602 and the second heat sink 604 by fasteners such as screws. For example, the second end plate 512 may include one or more apertures that enable fastening the second end plate 512 to one or more of the first heat sink 602 and the second heat sink 604. The first end plate 510 shown in FIG. 5 may also be attached to one or more of the first heat sink 602 and second heat sink 604 in a manner similar to the second end plate 512.

FIG. 8 illustrates a close up view of a portion of the multiple waveguide edge lit structure of FIG. 5 according to an example embodiment. As illustrate in FIG. 8, the first end plate 510 includes the aperture 514, a first flange 802, and a second flange 804. A pair of wires 516 pass through the aperture 516 and are coupled the LED circuit board 504. For example, the pair of wires 504 can be used to provide power to the plurality of LEDs 606 and 608 shown in FIGS. 6 and 7. The first end plate 510 is attached to the frame structure 502 (for example, to one or both of the first heat sink 602 and second heat sink 604) by one or more fasteners 806.

The first end plate 510 can prevent the first waveguide 506 and the second waveguide 508 from detaching from the first heat sink 602 and the second heat sink 604, respectively, for example, by sliding out at the end of the first heat sink 602 and second heat sink 604 shown in FIG. 8. Further, the first flange 802 and the second flange 804 along with the first flange 618 and the second flange 620 of the second end plate 512 shown in FIG. 6 can keep the first waveguide 506 and the second waveguide 508 attached to the first heat sink 602 and the second heat sink 604, for example, by pressing against the first waveguide 506 and the second waveguide 508 towards the first heat sink 602 and the second heat sink 604. The first flange 802 may also keep the first waveguide 506 from sliding away from the LED circuit board 504 by abutting against the second protrusion 622. Similarly, the second flange 804 may keep the second waveguide 508 from sliding away from the LED circuit board 504 by abutting against the second protrusion 624. In an example embodiment, the first waveguide 506 may simply rest on the first flange 802 of the first end plate 510 and on the first flange 618 of the second end plate shown in FIG. 6.

Although the pair of wires 516 may pass through the aperture 514 to be coupled to the LED circuit board 504, in alternative embodiments, the pair of wires 516 may be attached to the LED circuit board 504 without going through the aperture 514. In some example embodiments, the first end plate 510 may not have the aperture 514.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the present disclosure and the following claims, the scope of which are to be accorded the broadest interpretation so as to encompass modifications and equivalent structures.

What is claimed is:

1. A multiple waveguide edge lit structure, comprising:
   a frame structure;
   a circuit board including a first plurality of light emitting diodes (LEDs) and a second plurality of LEDs;
   a first waveguide, wherein a light receiving edge of the first waveguide is positioned proximal to the first plurality of LEDs;
   a second waveguide, wherein a light receiving edge of the second waveguide is positioned proximal to the second plurality of LEDs; and
   a pair of attachment structures, wherein the first waveguide and the second waveguide are attached to the frame structure by the pair of attachment structures.

2. The structure of claim 1, wherein the first plurality of LEDs and the second plurality of LEDs are positioned on a surface of the circuit board.

3. The structure of claim 2, wherein the pair of attachment structures includes a first clamp and a second clamp, wherein the first clamp is attached to the frame structure at a first end of the frame structure, wherein the second clamp is attached to the frame structure at a second end of the frame structure opposite the first end, and wherein each of the first clamp and the second clamp presses against the first waveguide and the second waveguide.

4. The structure of claim 1, wherein the first plurality of LEDs are positioned on a first surface of the circuit board, wherein the second plurality of LEDs are positioned on a second surface of the circuit board opposite the first surface, and wherein the first plurality of the LEDs and the second plurality of the LEDs are positioned on the circuit board adjacent to the frame structure.

5. The structure of claim 4, wherein the pair of attachment structures includes a first end plate and a second end plate, the first end plate disposed at a first side of the frame structure, the second end plate disposed at a second side of the frame structure, wherein the first waveguide rests on a first flange of the first end plate and on a first flange of the second end plate, and wherein the second waveguide rests on a second flange of the first end plate and on a second flange of the second end plate.

6. A multiple waveguide edge lit structure, comprising:
   a frame structure;
   a circuit board including a first plurality of light emitting diodes (LEDs) and a second plurality of LEDs, wherein the first plurality of LEDs and the second plurality of LEDs are positioned on a surface of the circuit board;
   a first waveguide, wherein a light receiving edge of the first waveguide is positioned proximal to the first plurality of LEDs;

a second waveguide, wherein a light receiving edge of the second waveguide is positioned proximal to the second plurality of LEDs; and a pair of clamps, wherein the first waveguide and the second waveguide are attached to the frame structure by the pair of clamps.

7. The structure of claim 6, wherein a first clamp of the pair of clamps is attached to the frame structure at a first end of the frame structure and wherein a second clamp of the pair of clamps is attached to the frame structure at a second end of the frame structure opposite the first end.

8. The structure of claim 6, wherein the light receiving edge of the first waveguide is a narrow surface of the first waveguide and wherein the light receiving edge of the second waveguide is a narrow surface of the second waveguide.

9. The structure of claim 6, wherein the first plurality of the LEDs are disposed on the surface of the circuit board proximal to a first edge of the circuit board and wherein the second plurality of the LEDs are disposed on the surface of the circuit board proximal to a second edge of the circuit board.

10. The structure of claim 6, wherein the frame structure includes a first heat sink and a second heat sink, wherein the first plurality of the LEDs and the light receiving edge of the first waveguide are positioned between a first side wall of the first heat sink and the second heat sink and wherein the second plurality of the LEDs and the light receiving edge of the second waveguide are positioned between a second side wall of the first heat sink and the second heat sink.

11. The structure of claim 10, wherein the second heat sink includes a first channel and a second channel, the first channel extending longitudinally on a first side of the second heat sink, and the second channel extending longitudinally on a second side of the second heat sink opposite the first side, wherein the first channel is configured to receive a protruding portion of the first waveguide and wherein the second channel is configured to receive a protruding portion of the second waveguide.

12. The structure of claim 6, wherein each clamp of the pair of clamps presses against the first waveguide and the second waveguide towards frame structure.

13. The structure of claim 6, wherein the frame structure includes protrusions to dissipate heat.

14. The structure of claim 13, wherein a first set of the protrusions are proximal to the first plurality of LEDs and extend away from the first plurality of LEDs and wherein a second set of protrusions are proximal to the second plurality of LEDs and extend away from the second plurality of LEDs.

15. A multiple waveguide edge lit structure, comprising:
a frame structure;
a circuit board including a first plurality of light emitting diodes (LEDs) and a second plurality of LEDs, wherein the first plurality of LEDs is positioned on a first surface of the circuit board and wherein the second plurality of LEDs is positioned on a second surface of the circuit board opposite the first surface;
a first waveguide, wherein a light receiving edge of the first waveguide is positioned below the frame structure proximal to the first plurality of LEDs; and
a second waveguide, wherein a light receiving edge of the second waveguide is positioned below the frame structure proximal to the second plurality of LEDs.

16. The structure of claim 15, further comprising a pair of end plates configured to keep the first waveguide and the second waveguide attached to the frame structure, wherein a first end plate of the pair of end plates is attached to the frame structure at a first end of the frame structure and wherein a second end plate of the pair of end plates is attached to the frame structure at a second end of the frame structure opposite the first end.

17. The structure of claim 15, wherein the first waveguide rests on a first flange of the first end plate and on a first flange of the second end plate and wherein the second waveguide rests on a second flange of the first end plate and on a second flange of the second end plate.

18. The structure of claim 15, wherein a protruding portion of the first waveguide is positioned in a first channel extending longitudinally on a first side of the frame structure, wherein a protruding portion of the second waveguide is positioned in a second channel extending longitudinally on a second side of the frame structure, and wherein the first channel and the second channel are on opposite sides of the circuit board.

19. The structure of claim 18, wherein the protruding portion of the first waveguide is positioned in the first channel such that the light receiving edge of the first wave guide is at a first distance from the first plurality of LEDs and wherein the protruding portion of the second waveguide is positioned in the second channel such that the light receiving edge of the second wave guide is at a second distance from the second plurality of LEDs.

20. The structure of claim 15, wherein the first plurality of the LEDs and the second plurality of the LEDs are positioned proximal to an edge of the circuit board and adjacent to the frame structure.

* * * * *